UNITED STATES PATENT OFFICE.

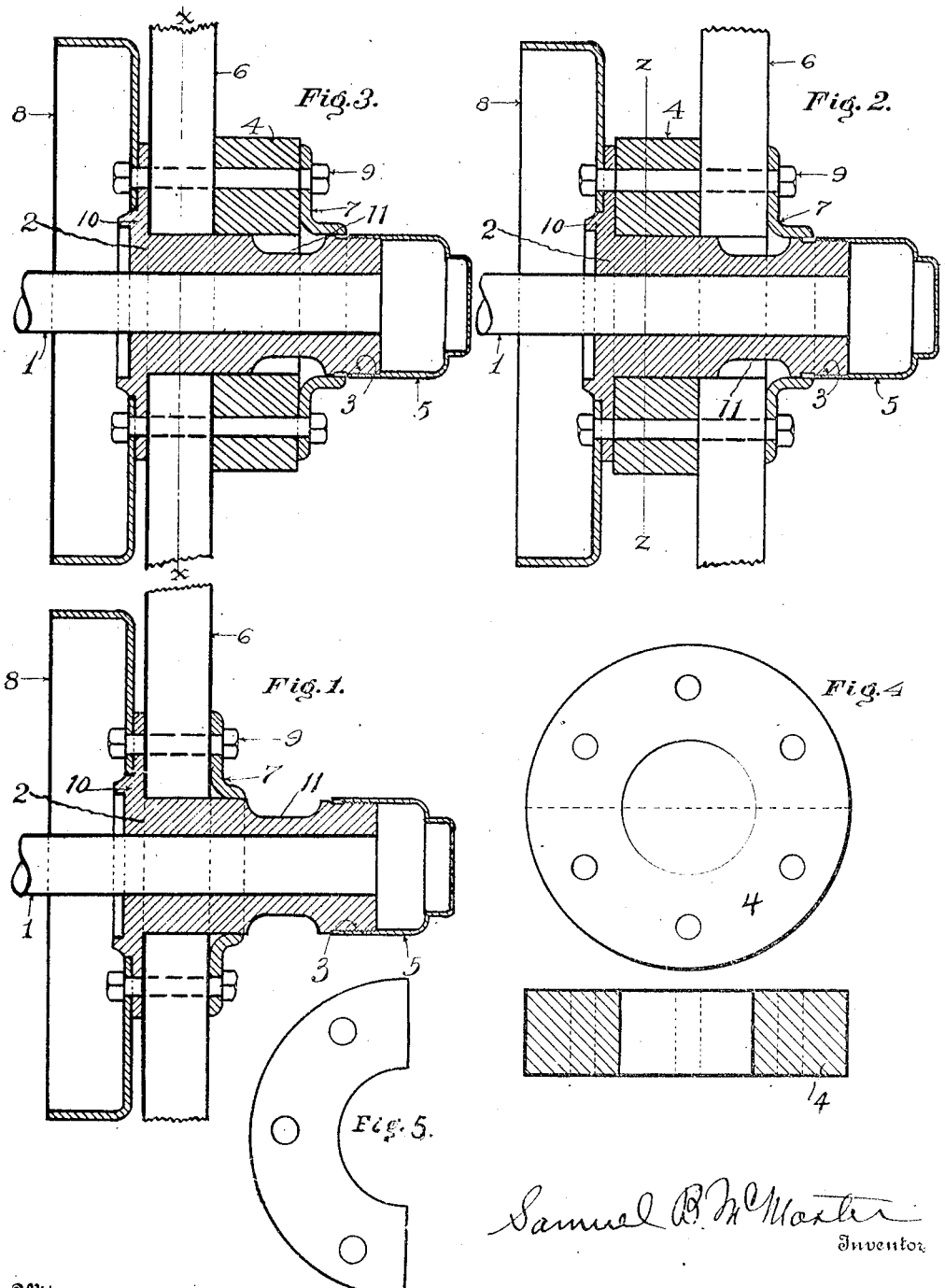

SAMUEL BUCHANAN McMASTER, OF COLUMBIA, SOUTH CAROLINA.

WHEEL.

No. 876,386.

Specification of Letters Patent.

Patented Jan. 14, 1908.

Application filed August 3, 1907. Serial No. 386,928.

*To all whom it may concern:*

Be it known that I, SAMUEL BUCHANAN McMASTER, a citizen of the United States, residing at Columbia, in the county of Richland and State of South Carolina, have invented certain new and useful Improvements in Wheels, of which the following is a specification.

My invention relates to road vehicle wheels, and is particularly adaptable to motor vehicles; and its object is to provide means for readily shifting the position of a wheel on its axle-box to vary the axle distance between wheels.

There is great annoyance in traveling from one locality to another by country roads due to the varying road gage, or distance between ruts, in different localities; and since the perfection of high speed motor cars, this mode of travel has become more general and the annoyance is aggravated by the weight of the vehicles and their operating parts. A car which can readily take a steep hill and develop speed with little power when the wheels get a good "tractive grip" is greatly handicapped when running in heavy sand and mire. This gage variation is only a few inches while the rut of the average country road, consisting of sand or uneven clay is from one to four inches deep, thus causing excessive side thrusts on the bearings and continual annoyance at the steering gear, due to the wheels running in and out of the rut on one side.

My invention provides means for easily adjusting the wheels on their boxes at any time, and which can be used with types of wheels now in general use without altering the wheel parts and without the use of tools other than a wrench.

My invention will be best understood by the following description, reference being had to the accompanying drawings forming part of this specification, and in which—

Figure 1 represents a cross sectional elevation of the hub of one type of vehicle wheel now in general use, with its spokes broken away. Fig. 2 is a cross section through the hub of the wheel showing my invention adapted thereto for broadening the gage. Fig. 3 shows a similar view with the wheel in its normal position. Fig. 4 shows one form of my adjusting block; and Fig. 5 shows a sector, a plurality of which may be used in forming the spacing plate or block In Fig. 1, 1 is an axle on which is mounted the axle-box consisting of a cylindrical wheel supporting part 2, having a shoulder 10 at one end and a screw threaded end 3 for receiving the dust cap 5; the wheel supporting part in this instance having a reduced section 11. The wheel 6 is mounted on the box adjacent to the shoulder, and the clamping collar 7 is mounted on the box outside of the wheel nave. 8 is a flanged disk for attaching the brake drum or the driving connection. The wheel nave, axle-box shoulder and clamping collar all have registering holes through which bolts 9 pass, and which positively clamp the parts together.

Fig. 2 shows the wheel in cross-section with my gage changing block 4 mounted between the shoulder of the box and the wheel nave, for increasing the gage, and having transverse perforations or openings through which the bolts 9 pass to clamp the parts together. The parts are preferably positively clamped to avoid any uneven strains which may arise from shifting the position of the wheel.

Fig. 3 shows the gage block mounted outside of the wheel nave where it will be carried when running on narrow gage roads. The gage block may be made in sections or in a single piece, both having their advantages, and it may be of wood, fiber, vulcanized rubber, or made in the form of a hollow metallic spool or drum or of any other suitable material. The spacing block if used only on one side of the wheel should be of a thickness equal to the difference between the road gages on which it is to be used; and if used on both sides of the vehicle the thickness of the block should be equal to one-half the difference between the road gages.

It will be seen from the above description that no alterations to the wheel parts are required and that no new parts are used other than the use of longer clamping bolts in place of the shorter ones with which the wheels are ordinarily equipped. Where the block is used in sections, to change the gage of the vehicle, it is only necessary to withdraw the bolts, remove the block sections, shift the wheel on its box and place the blocks on the other side of the wheel, when the bolts are inserted and the parts clamped together. When the blocks are used in one piece, it is necessary to slip the wheel from the axle-box in making the change, but otherwise the operation is precisely the same.

Having thus described my invention, what I claim as new and desire to secure by Letters Patent of the United States is:

1. In combination with a road vehicle, an axle-box having a shoulder, a wheel mounted upon said box, a removable clamping piece, spacing means adapted to either side of the wheel nave, and means for securing said parts together.

2. In combination with a road vehicle and its axle, an axle-box having a shoulder, a wheel mounted thereon, a removable collar, gage changing means adapted to fit between said shoulder and wheel nave, and means for securing said parts together.

3. In combination with a road vehicle and its axle, an axle-box having an integral shoulder, a wheel mounted on said box, a removable clamping piece, spacing blocks carried on either side of the wheel nave between said shoulder and clamping piece, and means for securing said parts together, substantially as and for the purpose set forth.

4. In combination with a road vehicle and its spindle, an elongated axle-box having a shoulder, a wheel mounted on said box and having transverse openings through its nave, a removable collar on said box, gage changing pieces having one or more openings registering with the openings in the nave of the wheel and carried between said shoulder and collar, and bolts for securing said collar, gage pieces and wheel to the axle-box.

5. In combination with a road vehicle and its spindle, an elongated axle-box having an inner shoulder, a road wheel mounted on said box and having transverse perforations through its nave, a removable perforated collar for said box, gage adjusting sectors carried on either side of the wheel nave and having perforations registering with the perforations through the nave and collar, and bolts passing through said perforations and positively locking said parts together.

6. In combination with a road vehicle and its spindle, an axle-box having an integral inner shoulder with openings, a wheel mounted on said box and having transverse perforations through its nave, a removable perforated collar for said box, a gage adjusting disk or plate interchangeably mounted with said wheel and having perforations registering with those in the other parts, and bolts for securing said parts positively to the axle-box shoulder.

7. An axle-box or sleeve having a supporting wheel and gage spacing means interchangeably mounted thereon, and means for clamping said wheel and spacing means to the axle-box or sleeve.

In testimony whereof I affix my signature in presence of two witnesses:

SAMUEL BUCHANAN McMASTER.

Witnesses
   THEOD. O. HAMBY,
   A. R. CRONENBERG.